A. SINDING-LARSEN.
PROCESS OF MANUFACTURING SILICON NITRID.
APPLICATION FILED MAR. 17, 1909.
928,476.
Patented July 20, 1909.
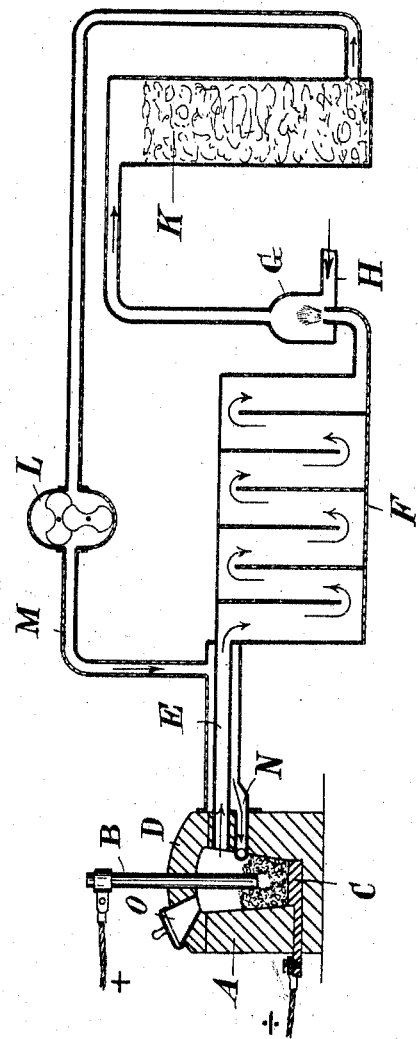
Witnesses.
Jesse K. Sutton.
B. V. Sommers
Inventor.
Alf Sinding-Larsen
by Henry Orth
Atty.

UNITED STATES PATENT OFFICE.

ALF SINDING-LARSEN, OF CHRISTIANIA, NORWAY.

PROCESS OF MANUFACTURING SILICON NITRID.

No. 928,476.　　　　　Specification of Letters Patent.　　　Patented July 20, 1909.

Application filed March 17, 1909. Serial No. 484,047.

*To all whom it may concern:*

Be it known that I, ALF SINDING-LARSEN, a subject of the King of Norway, residing at Christiania, Norway, have invented certain new and useful Improvements in the Process of Manufacturing Silicon Nitrid; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention consists in an improved process of manufacturing silicon nitrid by causing silicon in the free state to combine with nitrogen.

Silicon nitrid, which has not heretofore been produced in an industrial manner, was however several years ago pointed out by Mehner (in German patent No. 88999) as a nitrogen compound with a very high percentage of nitrogen, for the manufacture of which the nitrogen of the air could be employed, and which might serve as a primary material for the manufacture of other nitrogen compounds. The process proposed by Mehner is however inefficient and also very expensive and very likely this is the reason, why the process has not yet been carried out industrially. According to Mehner nitrogen is conducted through a charge of silicates and carbon, which is heated in an electric furnace. By this means silicon nitrid will be only in part produced, the presence of carbon giving rise to the formation of silicon carbid nitrid (carbazotsilicon) such as already pointed out by L. Spiegel. Moreover the nitrogen compounds, which might be formed by this process, cannot without great difficulties be separated from the resulting slag. These difficulties are overcome by the present process, according to which vapors or a fine dust of silicon of a high temperature is acted upon by hot nitrogen, and the silicon nitrid resulting thereby taken up in filtering or deposition chambers, where it is collected in the form of a fine dust or powder.

The process may suitably be carried out in combination with the production of silicon or in connection with processes, by which silicon is obtained as a residual by-product. When carried out in connection with the manufacture of silicon the process may be conducted as follows: A charge comprising silica or a silicate together with the amount of carbon necessary for reducing the silica, is heated in a closed electric furnace inside or outside of which is arranged a chamber for taking up the vapors and gases generated during the reduction process. The furnace is connected through a discharge pipe with suitable filtering or deposition chambers, in which the nitrid is taken up. Nitrogen is introduced into the vapor chamber of the furnace through pipes, which inclose or are inclosed in the discharge pipe for the purpose of utilizing the heat carried away by the escaping gases to heat the nitrogen. The nitrogen supplying pipes are preferably arranged in such a manner as to impart a whirling motion to the gases and vapors in the furnace. (The nitrogen may also be introduced through the electrodes). The reaction between the silica and the carbon in the charge will result in the formation of silicon vapors and carbonic oxid gas, which in the vapor chamber is mixed with the hot nitrogen gas. This latter is preferably introduced in great excess of the carbonic oxid. At the high temperature prevailing in the vapor chamber the silicon vapors and the silicon dust resulting from the vapors being in part condensed, will now combine with the nitrogen forming silicon nitrid as a fine dust, which together with carbonic oxid from the reduction process and surplus nitrogen as well as other gases, which might have been introduced together with the nitrogen are drawn through the above mentioned filtering or deposition chambers, where the silicon nitrid is taken up. If necessary the product obtained hereby is afterward purified for instance by washing, magnetic separation or the like.

The nitrogen necessary for carrying out the process may be obtained in a sufficiently pure condition from atmospheric air for instance by burning in this latter the carbonic oxid obtained in the reduction process mentioned above. By taking the carbonic dioxid formed thereby up into a suitable absorbent for instance water, lime or the like, a gas consisting mainly of nitrogen, is obtained.

In the accompanying drawing is illustrated an arrangement of apparatus, which might be employed in carrying out the process.

In this drawing A represents an electrode furnace with an upper electrode B and a bottom electrode C, the crucible shaped furnace chamber being covered by a lid D. The furnace is connected through the flue E with deposition chambers F, from which the gases are drawn through a combustion apparatus G into which air is introduced through the pipe H. The combustion chamber is connected with the absorption apparatus K, in which carbonic acid and water contained in the gases passing through the same from the combustion chamber are retained. In the pipe M connecting the absorption apparatus with the electric furnace is arranged a rotating blower L for forcing the gases into the furnace through the tangentially arranged inlet pipe N. The charge of silica and carbon is introduced into the furnace through the opening O in the furnace cover D.

The process may also be carried out in connection with the manufacture of silicids. These latter, especially ferrosilicon, are usually produced in an electric furnace by reducing silica or silicates, to which is added the metal or an oxid of the metal in question and other substances. According to the manner in which the furnace is worked during these processes, whether a high or low temperature, or a more or less "covered" arc is employed, and according to the concentration of the silicid, a greater or smaller part (up to about 50 per cent.) of the silicon liberated during the process will be volatilized, and this part of the silicon has hitherto represented a loss, which may be avoided by utilizing the silicon vapors in the manufacture of silicon nitrid in accordance with the above described process. By utilizing the escaping silicon vapors in this way the silicid production would be made much more profitable than it is at present possible.

The constructive arrangement of the vapor and gas reaction chamber, the nitrogen supply and the apparatus for collecting the silicon nitrid may as a matter of course be modified according to the circumstances in each specific case.

The silicon and nitrogen employed in the process may be produced in any proper way, but in every case to these bodies should be imparted the high temperature necessary for causing a reaction to take place.

Claims.

1. In the production of silicon nitrid the process which consists in producing vapors of silicon and causing the same to be acted upon by gaseous nitrogen in heated condition.

2. In the production of silicon nitrid the process, which consists in producing an atmosphere containing vapors of silicon and finely divided particles of silicon and causing the same to be acted upon by an atmosphere containing heated nitrogen gas.

3. In the production of silicon nitrid the process which consists in producing an atmosphere containing vapors of silicon and cooling the same so as to obtain finely divided particles of silicon and causing the same to be acted upon by an atmosphere containing heated nitrogen gas.

4. In the production of silicon nitrid the process which consists in establishing an atmosphere chiefly containing nitrogen gas in a chamber forming part of or connected with an electric furnace, feeding material to the furnace for the production of silicon by a reduction process at a temperature causing a vaporizing of the whole or part of the silicon formed.

5. In the production of silicon nitrid the process, which consists in establishing an atmosphere chiefly containing nitrogen gas in a chamber forming part of or connected with an electric furnace, feeding material to the furnace for the production of silicids and silicon at a temperature causing a vaporizing of the silicon.

6. In the production of silicon nitrid the process, which consists in producing vapors of silicon by heating a silicid and causing the same to be acted upon by gaseous nitrogen in heated condition.

In testimony that I claim the foregoing as my invention, I have signed my name in presence of two subscribing witnesses.

ALF SINDING-LARSEN.

Witnesses:
 HENRY BORDEWICH,
 AUG. OLSEN.